3,028,247
Patented Apr. 3, 1962

1

3,028,247
DENTAL COMPOSITION AND PROCESS
OF MAKING SAME
Eugene J. Molnar, 713 S. Stone Ave., La Grange, Ill.
No Drawing. Filed Jan. 5, 1960, Ser. No. 503
15 Claims. (Cl. 106—35)

This invention relates to formable cementitious compositions of matter which are settable into solid coherent masses. More in particular this invention relates to compositions of matter particularly suitable for dental applications such as temporary fillings, bonding material for inlays and crowns, protective covering of tissue after gum resection, cavity lining under plastic and metal fillings, registering bite relationships, relining dentures and other applications in connection with dental restorations.

For many years professional dental practice employed, for the above purposes, compositions of matter comprising as principal ingredients thereof, rosin, zinc oxide and oil of clove the latter of which is chiefly the chemical compound "eugenol." Frequently patients as well as dentists are allergic to spices of which clove is one, and oftentimes the slightest contact with them or their derivatives causes adverse effects from allergic reactions. Also eugenol attacks and damages many dental plastics particularly the acrylate type which is used extensively in dentistry. Furthermore eugenol has an odor offensive to many persons as well as a cause of an oral acrimonial or burning taste sensation.

In addition to the above mentioned disadvantages the chief source of eugenol is East Africa and its availability and price fluctuate greatly due to the quality and quantity of clove crop as well as influence of political conditions in the countries of origin.

In the presently available dental compositions, as stated above, eugenol is a principal reactive ingredient and the amount employed in known compositions is as high as 30 percent by weight. In such compositions an appreciable portion of the eugenol present remains in the free state and consequently most of the above described disadvantages exist while in the patient's mouth and/or in contact with the tissue. For such reasons it is fairly presumed that many unsuccessful attempts have been made to eliminate eugenol from known compositions.

A prime object of the present invention is to provide a dental composition of matter which is settable into a coherent solid cementitious material without the above described disadvantages and process therefor.

Another important object of the present invention is to provide an improved settable dental composition of matter without eugenol or its derivatives.

A yet further objective of this invention is to provide a settable dental composition of matter employing carboxylic organic acids which are liquid at temperatures up to about 65° C. with other ingredients.

A still further object of the present invention is to provide an improved settable dental composition of matter of low cost employing domestic ingredients.

These and other desirable and important objects inherent in and encompassed by the invention will be more readily understood from the ensuing description and the appended claims.

It is well known that most of the organic fatty acids readily form salts with metallic oxides, hydroxides and some carbonates and even certain finely powdered elemental metals such, as for example, zinc metal. Many of these fatty acids originate in vegetable oils, animal fats and oils, marine fats and oils, or they may be synthesized by known chemical processes. However when they are reacted with polyvalent metals or their hydroxides, oxides and carbonates, the resulting salts or "soaps," as they are sometimes referred to, are granular

2 if the rate of reaction is great. The characteristics of these metallic organic salts depend upon the fatty acid and/or the metal employed. Most of these metallic organic salts of fatty acids, using the above mentioned metals, are not only insoluble in water but also are not "wetted" by water. As will be apparent later herein, certain of these metallic organic salts of fatty acids or their derivatives are satisfactory for many of the above described dental applications directly, that is, without additional ingredients. However, during the course of investigation it was found that the reaction of metal salt formation could be modified by a third ingredient in the form of a resin which possessed unreacted carboxyl groups. Rosin, for example, possesses unreacted carboxyl groups and was found to be an excellent agent for modifying fatty acid salt-forming reactions with polyvalent metals, metallic hydroxides, metallic oxides and metallic carbonates. The term "rosin" as herein employed is understood to consist essentially of abietic acid and its related isomers together with neutral or unsaponifiable compounds. Modified rosin (e.g. oxidized, hydrogenated or polymerized) is preferably employed in this invention all having carboxyl groups available particularly in the presence of traces of water. From the chemical reaction viewpoint it appears from this investigation that a requisite characteristic of the resin employed must possess unreacted or available carboxyl groups. The term "carboxyl group" as herein described is intended to include the anhydride form derived from carboxyl groups.

Since it is necessary that for the above described dental applications the product must be essentially water insoluble, the metal constituent thereof thus precludes the alkali metals including ammonium. Likewise lower saturated organic carboxylic acids having less than 6 carbon atoms are unsatisfactory because the water solubility of the acids and the products resulting therefrom are too high. Furthermore these lower acids are too strongly acidic and thus their chemical activity is too great, and have objectionable odor. The upper limit in the number of carbon atoms in the fatty acid molecule depends upon its melting point. It is preferable for dental applications that the melting point of the acid be not above 65° C. as acids having a higher melting point are insufficiently reactive for purposes of this invention. Preferably the acid should be liquefiable at 45° C. or below. Thus erucic acid, a carboxylic unsaturated acid having 22 carbon atoms, was found to be satisfactory while palmitic and stearic acids were not satisfactory unless heat was applied. Organic carboxylic acids such as caproic, heptylic, caprylic, undecylenic, capric, pelargonic, isodecanoic, oleic, erucic, undecanoic, linoleic and other members of the fatty aids are liquids at oral temperature. Likewise the fatty acid constituents in babassu oil, palm kernel oil and coconut oil are liquids at oral temperatures and suitable for use in this invention. However other fatty acids such as lauric, myristic, tridecanoic and also naphthenic acid have been satisfactorily employed but may require some heating to their melting point preparatory to reaction, or, in the alternative if such acids are mixed in one or more other liquid fatty acids they can be satisfactorily employed. Aryl-alkyl acids may also be employed provided that the acid constituent thereof is carboxylic. Phenylstearic acid, a saturated derivative of oleic acid is one example of an aryl-alkyl carboxylic acid which can be used.

The preferred salt-forming ingredient reactive with the carboxylic acids are the powdered oxides or hydroxides of the polyvalent metals magnesium, zinc, calcium, copper, barium, strontium, cadmium, cobalt, lead, iron, mercury and nickel. Some metallic carbonates or basic carbonates such as those of copper and zinc can be used but in all probability the initial reaction with the organic acid converts them to oxides. Further the particle size of the powder should preferably be as small as possible, ranging from 325 mesh to one micron.

This invention contemplates the production of useful dental metal-organic salts by the direct reaction at a temperature of about 10° C. to about 65° C. to between at least one organic carboxylic acid with a reactive polyvalent metal or reactive inorganic polyvalent metal compounds wherein the acid or acids employed are in liquid or extrudable form. Further, in those cases where the salt-forming reaction is too rapid, this invention also contemplates the employment of a resin having unreacted or available carboxyl groups present to decrease the reaction rate. The function of the resin having unreacted or available carboxyl groups is believed to reside in the ability of the resin to form mixed salts wherein the product contains molecules of the resin chemically linked to the selected polyvalent metal and the selected organic carboxylic acid.

The reaction rate between an organic carboxylic acid and a metal oxide or metal hydroxide is not only influenced by temperature but also by the chemical characteristics of both reactants. Where the reaction rate is too rapid the product formed is usually in granular form and unsuitable for this invention. Where a resin having available carboxyl groups is employed to modify the reaction rate, the resin, such as for example powdered modified rosin, is mixed or dissolved in the organic carboxylic acid which provides a beneficial effect in regulating the rate of reaction and improves the physical properties of the product particularly in that the product is not granular. Thus part of the role of the resin during the hardening or setting reaction is to prevent the formation of granules or to prevent the product from being too brittle. Where the resin is employed the product apparently is a continuous and interlocking basic soap structure in which unreacted ingredients are imbedded therein. Since organic reactions have a tendency to cease prior to completion even when stoichiometric quantities are used, the resulting product may well be heterogeneous rather than homogeneous.

Where the reactions in the above mentioned discussion are too slow a small amount of an accelerating agent may be dissolved in the liquid carboxylic acids to increase the reaction rate. Pimelic acid, suberic acid, azelaic acid, alcohols such as ethyl alcohol, alkyl salts such as zinc acetate and sebacic acid are examples of good accelerating agents. On the other hand where the reaction rate even with the resin is still too great, a small amount of reaction retarding agents may be dissolved in the liquid organic carboxylic acids. Organic triols such as glycerol, certain organic amino alcohols such as triethanolamine, and tetrabutyl titanate are excellent retarding agents for the reactions of this invention. Thus for a given temperature the reaction rate may be controlled precisely by employing an accelerating agent or retarding agent as may be required.

Other ingredients may also be added to the above discussed basic ingredients for numerous purposes or to obtain special desired qualities. Oils, either neutral (mineral or vegetable) or active (e.g. brominated), may be employed to regulate viscosity; bonding agents such as Venice turpentine or gum elemi may be added to increase cohesiveness and adhesiveness; odor and taste masking ingredients of numerous known varieties; and also fillers (e.g. mica powder), toughening agents and germicidal compounds and medicinal agents may be added to obtain desired secondary benefits.

Although illustrative of the invention but not limited thereto the following examples are shown:

*Example 1*

Erucic acid _____ 24 grams (24%)
Zinc oxide (ZnO) _____ 60.8 grams (60.8%)
Magnesium oxide (MgO) _____ 15.2 grams (15.2%)

The metallic oxides were first intimately mixed together. The acid was then added to the oxide mixture at room temperature and then elevated to 36° C. (about normal body temperature) and mixed. The resultant mass set into a hard solid product in 3 hours.

*Example 2*

Erucic acid _____ 12 grams (12%)
Magnesium oxide (MgO) _____ 88 grams (88%)

The acid and oxide were mixed together at room temperature and then elevated to 36° C. (about normal body temperature). The resultant mass set into a hard solid product in 2 hours.

*Example 3*

Erucic acid _____ 72 grams (72%)
Magnesium oxide (MgO) _____ 28 grams (28%)

The acid and oxide were mixed together at room temperature and then elevated to 36° C. The resultant mass set into a hard solid product in 30 minutes.

From Examples 1, 2 and 3 it is apparent that wide variation in the amount of acid with respect to the oxide is permissible and yet obtain a hard product although the curing or setting time is effected thereby.

*Example 4*

Erucic acid _____ 12 grams (12%)
Zinc oxide (ZnO) _____ 88 grams (88%)

The acid and oxide were mixed together at 23° C. The resultant mass set into a hard solid product in 10 minutes.

*Example 5*

Erucic acid _____ 74 grams (74%)
Zinc oxide (ZnO) _____ 26 grams (26%)

The acid and oxide were mixed together at 23° C. The resultant mass set into a hard solid product in 30 minutes.

Examples 4 and 5 also illustrate the wide range of proportions permissible between the acid and oxide still resulting in a hard product. However even at the lower temperature the rate of reaction using zinc oxide is much greater than when magnesium oxide is used as is evident by comparison with Examples 2 and 3.

*Example 6*

Caproic acid _____ 6 grams (6%)
Zinc oxide (ZnO) _____ 94 grams (94%)

The acid and oxide were mixed together at 23° C. The resultant mass set into a hard solid product in 3 minutes.

*Example 7*

Caproic acid _____ 8.2 grams (54.7%)
Zinc oxide (ZnO) _____ 6.8 grams (45.3%)

The acid and oxide were mixed at 23° C. The resultant mass set into a hard but granular product within a few seconds, almost instantly.

*Example 8*

Caproic acid _____ 10 grams (10%)
Polypale resin (powdered) _____ 90 grams (90%)

The acid and resin were mixed together at 23° C. The resulting mass did not set.

The "Polypale" resin of Example 8 and elsewhere herein is a trade name product and is understood to be partially polymerized rosin (i.e. modified rosin). Example 8 illustrates there is no reaction between the organic acid and the resin.

Example 9

| | |
|---|---|
| Caproic acid | 8.2 grams (8.2%) |
| Zinc oxide (ZnO) | 6.8 grams (6.8%) |
| Polypale resin (powdered) | 85.0 grams (85%) |

The zinc oxide and Polypale resin were first intimately mixed to form an admixture. The admixture was then mixed with the acid at 25° C. The resultant mass set into a hard solid product in 5 minutes.

Example 10

| | |
|---|---|
| Caproic acid | 2.9 grams (2.9%) |
| Peanut oil (diluent) | 8.8 grams (8.8%) |
| Zinc oxide (ZnO) | 7.0 grams (7.0%) |
| Polypale resin (powdered) | 81.3 grams (81.3%) |

The acid and peanut oil were mixed together to form a first admixture or solution. The oxide and resin were mixed together to form a second admixture. The two admixtures were then mixed together at 25° C. The resultant mass set into a hard solid product in 4 hours.

The peanut oil in Example 10 and elsewhere herein is understood to consist principally of glycerides of oleic acid and linoleic acid with lesser amounts of palmitic, stearic, arachidic, behenic and lignoceric acids. Some of these esters are solids at normal room temperatures but the peanut oil mixture is a liquid.

Example 11

| | |
|---|---|
| Caproic acid | 4.0 grams (4.0%) |
| Peanut oil (diluent) | 8.0 grams (8.0%) |
| Zinc oxide (ZnO) | 7.0 grams (7.0%) |
| Polypale resin (powdered) | 81 grams (81.0%) |

Same as Example 10 except the amount of caproic acid was increased with a corresponding decrease in the amount of peanut oil. The resultant mass set into a hard solid product in 2 hours at 25° C.

Example 12

| | |
|---|---|
| Caproic acid | 5.1 grams (5.1%) |
| Peanut oil (diluent) | 5.1 grams (5.1%) |
| Zinc oxide (ZnO) | 6.3 grams (6.3%) |
| Polypale resin (powdered) | 83.5 grams (83.5%) |

Same as Example 11 except that the proportions of each of the various ingredients were changed. The resulting mass set into a hard solid product in 30 minutes at 25° C.

Example 13

| | Grams |
|---|---|
| Caproic acid | 3.4 |
| Ethyl cellulose | 1.0 |
| Polypale resin | 4.0 |
| Gum elemi | 0.005 |
| Lanolin (anhydrous) | 0.005 |
| Alcohol, ethyl | 1.6 |
| Magnesium oxide (MgO) | 60 |
| Zinc oxide (ZnO) | 35 |
| Calcium hydroxide, Ca(OH)$_2$ | 5 |
| Mineral oil (heavy) | 25 |
| Tall oil | 5 |

The caproic acid, ethyl cellulose, Polypale resin, gum elemi, lanolin and ethyl alcohol were heated and intimately mixed together and allowed to cool into an extrudable paste-like mass to form a first admixture. The oxides, mineral oil and tall oil were intimately mixed together into an extrudable paste-like mass to form a second admixture. Equal quantities by weight of the two admixtures were then mixed together at 25° C. The resultant mass set into a hard solid product in 4 minutes.

It will be noted that both admixtures of Example 13 are of paste-like consistency. The ethyl cellulose is a filler or body-forming and toughening agent and the gum elemi increases adhesiveness and cohesiveness. The lanolin has dispersing properties and the ethyl alcohol is a volatile thinner and reaction rate accelerator. The mineral oil is added as a vehicle or carrier to convert the oxides into an extrudable paste-like state and the tall oil is a cohering agent. Since both admixtures are of paste-like consistency, they are extrudable from an ordinary collapsible lead alloy tube of the kind conventionally used for tooth paste, ointments, salves, etc. Further since equal weights of each of the two admixtures are required, by providing the tube with proper sized orifices the dentist can "measure" the proper proportion of each admixture conveniently by measuring equal lengths of the extruded admixtures preparatory to mixing them together. This affords the dentist a convenient means for proper proportioning without resorting to conventional gravimetric or volumetric methods which obviously are time consuming.

Example 14

| | |
|---|---|
| Oleic acid | 6 grams (6%) |
| Cupric hydroxide, Cu(OH)$_2$ | 94 grams (94%) |

The acid and the hydroxide were mixed together at 23° C. The resulting mass set into a hard solid product in 2 hours.

Example 15

| | |
|---|---|
| Oleic acid | 6 grams (6%) |
| Magnesium oxide, MgO | 94 grams (94%) |

The acid and the oxide were mixed together at 23° C. The resulting mass set into a hard solid product in 40 minutes.

Example 16

| | |
|---|---|
| Oleic acid | 6 grams (6%) |
| Zinc oxide, ZnO | 94 grams (94%) |

The acid and oxide were mixed together at 23° C. The resulting mass set into a hard solid product in 5 minutes.

Examples 14, 15 and 16 illustrate the relative effect of different acid reactive metal compounds on oleic acid where the same proportions are employed. It will be noted that the range of setting time varied from 5 minutes to as long as 2 hours.

Example 17

| | |
|---|---|
| Oleic acid | 15 grams (15%) |
| Zinc carbonate (basic) | 85 grams (85%) |

The acid and carbonate were mixed together at 25° C. The resulting mass set into a hard solid product in 30 minutes.

Example 18

| | |
|---|---|
| Undecylenic acid | 8.2 grams (54.7%) |
| Zinc oxide, ZnO | 6.8 grams (45.3%) |

The acid and oxide were mixed together at 25° C. The resulting mass set into a granular product almost instantly.

Example 19

| | |
|---|---|
| Undecylenic acid | 8.2 grams (8.2%) |
| Zinc oxide, ZnO | 6.8 grams (6.8%) |
| Polypale resin | 8.5 grams (85.0%) |

The oxide and resin were intimately mixed together to form an admixture. This admixture was then mixed with the acid at 25° C. The resulting mass set into a hard solid product in 5 minutes.

Examples 18 and 19 illustrate the advantage in modification of the composition resulting from the employment of the resin. The product of Example 18 is unsatisfactory in contrast to the highly satisfactory product obtained in Example 19.

Example 20

| | |
|---|---|
| Isodecanoic acid | 8.2 grams (54.7%) |
| Magnesium oxide, MgO | 6.8 grams (45.3%) |

At 23° C. the results obtained were about the same as that for Example 18.

Example 21

| | |
|---|---|
| Isodecanoic acid | 12 grams (12%) |
| Zinc oxide, ZnO | 88 grams (88%) |

The acid and oxide were mixed together at 23° C. The resulting mass set into a hard solid product in 25 minutes.

*Example 22*

| | |
|---|---|
| Isodecanoic acid | 8.2 grams (8.2%) |
| Magnesium oxide, MgO | 6.8 grams (6.8%) |
| Polypale resin | 85.0 grams (85.0%) |

The oxide and resin were intimately mixed together to form an admixture. This admixture was then mixed with the acid at 23° C. The resulting mass set into a hard solid product in 50 minutes.

Again it will be noted by comparing Example 20 with Example 22 that the inclusion of the resin results in obtaining a satisfactory product.

*Example 23*

| | |
|---|---|
| n-Heptylic acid | 10 grams (10%) |
| Cadmium hydroxide, Cd(OH)$_2$ | 90 grams (90%) |

The acid and hydroxide were mixed together at 25° C. The resulting mass set into a hard solid product in 4 hours.

*Example 24*

| | |
|---|---|
| Naphthenic acid | 12 grams (12%) |
| Magnesium oxide, MgO | 88 grams (88%) |

The acid and oxide were mixed together at 23° C. The resulting mass set into a hard solid product in 3 hours.

*Example 25*

| | |
|---|---|
| Soybean fatty acids | 12 grams (12%) |
| Zinc oxide, ZnO | 88 grams (88%) |

The soybean fatty acids were mixed with the oxide at 23° C. The resulting mass set into a hard solid product in 10 minutes.

*Example 26*

First admixture:

| | Grams |
|---|---|
| Capric acid | 13 |
| Lauric acid | 13 |
| Pelargonic acid | 3 |
| Azelaic acid | 0.3 |
| Dimerex resin | 10 |
| Polypale resin | 46 |
| Venice turpentine | 3 |
| Diatomaceous earth | 10 |
| Zinc acetate | 0.5 |
| Alcohol, ethyl | 3.2 |

Second admixture:

| | Grams |
|---|---|
| Magnesium oxide, MgO | 100 |
| Zinc oxide, ZnO | 100 |

The first admixture was heated and mixed intimately to form an extrudable composition. The "Dimerex" resin is a trade name and is understood to be modified rosin which was polymerized to a higher degree than that of the Polypale resin. The diatomaceous earth is known as "D calite," a trade name product, and is used as a filler material here. The first admixture in the amount of 2 grams was mixed with 3.5 grams of the second admixture and the resulting mass set into a hard solid product in 4 minutes.

*Example 27*

First admixture:

| | Grams |
|---|---|
| Caprylic acid | 30 |
| Lauric acid | 90 |
| Ethylcellulose (100 centipoises) | 9 |
| Polypale resin | 130 |
| Gum elemi | 15 |
| Brominol | 15 |
| Mica (powdered) | 25 |
| Chlorothymol | 4.5 |
| Zinc acetate | 7.0 |
| Bay oil (essential oil) | 4.5 |
| Alcohol, ethyl | 4.8 |

Second admixture:

| | Grams |
|---|---|
| Magnesium oxide, MgO | 250 |
| Zinc oxide, ZnO | 125 |
| Calcium hydroxide, Ca(OH)$_2$ | 20 |
| Copper oxide, Cu$_2$O | 10 |
| Mineral oil, heavy | 150 |
| Rosin oil | 20 |
| Chlorothymol | 9 |
| Cumarin | 1 |

Each of the two admixtures were mixed intimately to form extrudable paste-like compositions. The first admixture in the amount of 3.5 grams was mixed with 3.5 grams of the second admixture and the resulting mass set into a hard solid product in 3 minutes at 25° C.

*Example 28*

First admixture:

| | Grams |
|---|---|
| Coconut oil fatty acids | 21 |
| Linoleic acid 50%–oleic acid 50% | 21 |
| Polypale resin | 42 |
| Lanolin (anhydrous) | 4.2 |
| Mineral oil | 4.2 |
| Gum elemi | 4.2 |
| Vanillin | 1.6 |
| Alcohol, ethyl | 0.8 |

Second admixture:

| | Grams |
|---|---|
| Zinc oxide, ZnO | 100 |
| Magnesium oxide, MgO | 100 |

The first admixture was mixed intimately to form an extrudable composition. The first admixture, in the amount of 2.5 grams, was mixed with 3.5 grams of the second admixture. The resulting mass set into a hard solid product in 5 minutes at 25° C.

In Example 26 the azelaic acid is a reaction accelerating agent; the Venice turpentine is used to increase the cohesive and adhesive properties of the admixture; the diatomaceous earth is employed as a filler; the zinc acetate as a reaction rate accelerator; and the alcohol as a thinning agent to regulate viscosity of the admixture and as a reaction rate accelerator.

In Example 27, which is a preferred embodiment of the invention for application as a temporary dental filling material, the ethyl cellulose is a filler or body-forming and toughening agent; the gum elemi to increase cohesion and adhesion of the admixture; the brominol is brominated olive oil and is used to regulate viscosity of the admixture; the mica is a filler; the chlorothymol is a germicidal antiseptic; and the bay oil is an essential oil having aromatic properties to provide pleasant taste and odor. In the second admixture the mineral oil is used to impart extrudability; the rosin oil is employed as a cohesive and adhesive agent; and the cumarin as a flavoring agent. In Example 28 the lanolin is used as a dispersing agent.

It will be noted that Examples 13, 26, 27 and 28 illustrate, specifically, highly useful compositions for dental operations, at least one admixture of each being in extrudable form suitable for flexible tube containers of the conventional metal or plastic types. However, it will be observed in these examples the basic ingredients of (*a*) at least one reactive carboxylic organic acid, (*b*) at least one inorganic metal compound reactive with the carboxylic acid, and (*c*) perhaps a resin having available carboxylic groups present as a reaction rate modifying agent. The other ingredients are added only to flavor the product, increase the cohesiveness and adhesiveness of the mixture, regulate viscosity, antiseptic and therapeutic enhancement, and filler material all of which are unreactive under conditions employed herein. Thus it has been shown how the basic ingredients can conveniently be modified to impart other desirable characteristics of the product.

In general it will be observed that an organic carboxylic acid having at least 6 carbon atoms in an extrudable state and an hydroxide or oxide of polyvalent metals such as magnesium, zinc, calcium, copper, barium, strontium, cadmium, iron, cobalt, lead, mercury and nickel can be successfully employed to produce hard solid cementitious compositions provided that the selected two ingredients require, when mixed together, at least one minute to set. It will also be noted from the above examples that the range of proportions of each of these two ingredients is not critical. The carboxylic acid ranges from about 6% to about 94% and the inorganic polyvalent metal compound ranges from about 6% to 94% by weight. When the two selected ingredients in the proportion used have a rapid set time (i.e. less than 1 minute), a satisfactory hard solid product can be obtained by modifying the reaction with a resin having unreacted or available carboxyl groups. The proportion of resin present is not critical as amounts as high as 85% by weight were successfully used. However, the resin may also be employed to modify the set time of the reaction between the inorganic metal compound with the organic carboxylic acid. Thus the proportion of resin can vary widely depending upon the organic carboxylic acid with the inorganic metallic compound used and the desired set time.

Having thus described numerous embodiments of the invention it can now be seen that the objects of the invention have been fully achieved and it must be understood that changes and modifications may be made which do not depart from the spirit of the invention nor from the scope thereof as defined in the appended claims.

What is claimed is:

1. A water insoluble solid and coherent dental composition of matter initially having a setting time of at least one minute to about 4 hours at a temperature between about 10° C. and about 65° C. consisting of the product obtained by reacting from 6 to 94 percent by weight of a flowable admixture consisting of an effective amount up to 85 percent by weight of a resin possessing available carboxyl groups as a reaction rate modifying agent and the balance being at least one organic carboxylic acid having at least 6 carbon atoms and melting below 65° C., with between 6 and 94 percent by weight of at least one powdered inorganic metal compound selected from the group consisting of oxides and hydroxides of alkaline earth metals, mercury, iron, nickel, cobalt, lead, zinc, cadmium and copper.

2. A water insoluble solid and coherent dental composition of matter initially having a setting time of at least one minute to about 4 hours at a temperature between about 10° C. and about 65° C. consisting of the product obtained by reacting from 6 to 94 percent by weight of an extrudable admixture consisting of an effective amount up to 85 percent by weight of a resin possessing available carboxyl groups as a reaction rate modifying agent and the balance being an organic carboxylic acid selected from the group consisting of erucic acid, lauric acid, caproic acid, tridecanoic acid, oleic acid, linoleic acid, myristic acid, undecylenic acid, undecanoic acid, isodecanoic acid, pelargonic acid, undecyclic acid, heptylic acid, capric acid and caprylic acid, with between 6 and 94 percent by weight of at least one powdered inorganic metal compound selected from the group consisting of oxides and hydroxides of alkaline earth metals, mercury, iron, nickel, cobalt, lead, zinc, cadmium and copper.

3. A water insoluble solid and coherent dental composition of matter initially having a setting time of at least one minute to about 4 hours at a temperature between about 10° C. and about 65° C. consisting of the product obtained by reacting from 6 to 94 percent by weight of a fluid admixture consisting of an effective amount up to 85 percent by weight of a resin possessing available carboxyl groups as a reaction rate modifying agent and the balance being an organic carboxylic acid selected from the groups consisting of erucic acid, lauric acid, caproic acid, tridecanoic acid, oleic acid, linoleic acid, myristic acid, undecylenic acid, undecanoic acid, isodecanoic acid, pelargonic acid, undecylic acid, heptylic acid, capric acid and caprylic acid, with between 6 and 94 percent by weight of at least one powdered inorganic compound selected from the group consisting of oxides and hydroxides of magnesium, zinc, calcium, cadmium, barium, strontium, mercury, iron, nickel, cobalt, lead and copper.

4. A water insoluble solid and coherent dental composition of matter initially having a setting time of at least one minute to about 4 hours at a temperature between about 10° C. and about 45° C. consisting of the product obtained by reacting from 6 to 94 percent by weight of a flowable admixture consisting of an effective amount up to 85 percent by weight of abietic acid anhydride as a reaction rate modifying agent and the balance being an organic carboxylic acid selected from the group consisting of tridecanoic acid, erucic acid, lauric acid, caproic acid, oleic acid, linoleic acid, myristic acid, undecylenic acid, isodecanoic acid, capric acid, undecanoic acid, pelargonic acid, undecylic acid, heptylic acid and caprylic acid, with between 6 and 94 percent by weight of at least one powdered inorganic compound selected from the group consisting of oxides and hydroxides of magnesium, zinc, calcium, cadmium, barium, strontium, mercury, iron, nickel, cobalt, lead and copper.

5. A process for preparing an orally formed water insoluble solid and coherent dental composition initially having a setting time of at least one minute to about 4 hours at a temperature between about 10° C. and about 38° C. consisting of the steps of preparing an essentially water insoluble organic acid compound consisting of at least one organic carboxylic acid having at least 6 carbon atoms in the linear chain and melting below 65° C., adding to said organic acid compound from 6 to 94 percent by weight based on said acid campound at least one powdered inorganic metal compound selected from the group consisting of oxides and hydroxides of alkaline earth metals, mercury, zinc, iron, cadmium, nickel, cobalt, lead and copper, mixing said compounds at a temperature between 23° C. and 65° C., orally applying said mixture and forming same, and allowing said formed mixture to set orally into said formed dental composition.

6. A process for preparing an orally formed water insoluble solid and coherent dental composition initially having a setting time of at least one minute to about 4 hours at a temperature of between 10° C. and 65° C. consisting of the steps of preparing an admixture consisting of an effective amount up to 85 percent by weight of a resin possessing available carboxyl groups and the balance being at least one organic carboxylic acid having at least 6 carbon atoms and melting below 65° C., adding to said admixture from 6 to 94 percent by weight based on said admixture at least one powdered inorganic metal compound selected from the group consisting of oxides and hydroxides of alkaline earth metals, mercury, iron, nickel, cobalt, lead, zinc, cadmium, and copper, mixing said compound with said admixture at a temperature between 23° C. and 65° C., orally applying said mixture and forming same, and allowing said formed mixture to set orally into said formed dental composition.

7. A process for preparing an orally formed water insoluble solid and coherent dental composition consisting of the steps of mixing about 6 to 55 parts by weight of caproic acid with about 45 to 94 parts by weight of powdered zinc oxide at a temperature between 23° C. and 37° C., orally applying said mixture and forming same, and allowing said formed mixture to set into said formed dental composition.

8. A process for preparing an orally formed water insoluble solid and coherent dental composition consisting of the steps of mixing about 6 parts by weight of oleic acid with about 94 parts by weight of a powdered compound selected from the group consisting of zinc oxide and magnesium oxide at a temperature between 23° C. and 37° C., orally applying said mixture and forming same, and allowing said formed mixture to set into said formed dental composition.

9. A process for preparing an orally formed water insoluble solid and coherent dental composition consisting of the steps of mixing about 12 parts by weight of isodecanoic acid with about 88 parts by weight of powdered zinc oxide at a temperature between 23° C. and 37° C., orally applying said mixture and forming same, and allowing said formed mixture to set into said formed dental composition.

10. A water insoluble solid and coherent dental composition of matter obtained by reacting at a temperature between 23° C. and 37° C. a mixture consisting of about 8 parts by weight of caproic acid, about 7 parts by weight of powdered zinc oxide and about 85 parts by weight of polymerized abietic acid.

11. A water insoluble solid and coherent dental composition of matter obtained by reacting at a temperature between 23° C. and 37° C. a mixture consisting of about 5 parts by weight of caproic acid, about 5 parts by weight of peanut oil, about 6 parts by weight of powdered zinc oxide and about 84 parts by weight of polymerized abietic acid.

12. A water insoluble solid and coherent dental composition of matter obtained by reacting a first admixture with an equal amount by weight of a second admixture at a temperature between 10° C. and 37° C., said first admixture being an extrudable mixture consisting of about 3.4 parts by weight of caproic acid, about 1 part by weight of ethyl cellulose as a toughening filler, about 4 parts by weight of modified rosin, about 0.005 part by weight of lanolin as a dispersing agent, about 0.005 part by weight of gum elemi as a cohesive and adhesive agent and about 1.6 parts by weight of ethyl alcohol as a reaction rate accelerator, and said second admixture being an extrudable mixture consisting of about 60 parts by weight of powdered magnesium oxide, about 35 parts by weight of powdered zinc oxide, about 5 parts by weight of powdered calcium hydroxide, about 25 parts by weight of mineral oil as a carrier, and about 5 parts by weight of tall oil as a cohesive agent.

13. A water insoluble solid and coherent dental composition of matter obtained by reacting about 2 parts by weight of a first admixture with about 3.5 parts by weight of a second admixture at a temperature between 10° C. and 37° C., said first admixture being an extrudable mixture consisting of about 13 parts by weight of capric acid, about 13 parts by weight of lauric acid, about 3 parts by weight of pelargonic acid, about 0.3 part by weight of azelaic acid as a reaction rate accelerator, about 56 parts by weight of modified rosin, about 3 parts by weight of Venice turpentine as a cohesive and adhesive agent, about 10 parts by weight of powdered diatomaceous earth as a filler, about 0.5 part by weight of zinc acetate as a reaction rate accelerating agent and about 3.2 parts by weight of ethyl alcohol as a thinner and reaction rate accelerating agent, said second admixture consisting of equal weights of powdered magnesium oxide and powdered zinc oxide.

14. A water insoluble solid and coherent dental composition of matter obtained by reacting a first admixture with an equal amount by weight of a second admixture at a temperature between 10° C. and 37° C., said first admixture being an extrudable mixture consisting of about 30 parts by weight of caprylic acid, about 90 parts by weight of lauric acid, about 9 parts by weight of ethyl cellulose as a toughening filler, about 130 parts by weight of modified rosin, about 15 parts by weight of gum elemi as a cohesive and adhesive agent, about 15 parts by weight of brominol as a viscosity regulator agent, about 25 parts by weight of powdered mica as a filler, about 4.5 parts by weight of chlorothymol as an antiseptic agent, about 7 parts by weight of zinc acetate as a reaction rate accelerating agent, about 4.5 parts by weight of bay oil as an odor mask and about 4.8 parts by weight of ethyl alcohol as a thinner and reaction rate accelerator, said second admixture being an extrudable mixture consisting of about 250 parts by weight of magnesium oxide, about 125 parts by weight of zinc oxide, about 20 parts by weight of calcium hydroxide, about 10 parts by weight of cuprous oxide, about 150 parts by weight of mineral oil as a carrier, about 20 parts by weight of rosin oil as a cohesive and adhesive agent, about 9 parts by weight of chlorothymol as an antiseptic agent and about 1 part by weight of cumarin as a flavoring agent.

15. A water insoluble solid and coherent dental composition of matter obtained by reacting about 2.5 parts by weight of a first admixture with about 3.5 parts by weight of a second admixture at a temperature between 10° C. and 37° C., said first admixture being an extrudable mixture consisting of about 21 parts by weight of coconut oil fatty acids, about 10.5 parts by weight of linoleic acid, about 10.5 parts by weight of oleic acid, about 42 parts by weight of modified rosin, about 4.2 parts by weight of lanolin as a dispersing agent, about 4.2 parts by weight of mineral oil as a carrier, about 4.2 parts by weight of gum elemi as a cohesive and adhesive agent, about 1.6 parts by weight of vanillin as a flavoring agent and about 0.8 part by weight of ethyl alcohol as a reaction rate accelerator, said second admixture consisting of equal weights of powdered zinc oxide and powdered magnesium oxide.

References Cited in the file of this patent

UNITED STATES PATENTS

| | | |
|---|---|---|
| 2,020,311 | Harrison | Nov. 12, 1935 |
| 2,516,438 | Wheeler | July 25, 1950 |
| 2,936,242 | Brauer | May 10, 1960 |

FOREIGN PATENTS

| | | |
|---|---|---|
| 550,484 | Canada | Dec. 17, 1957 |

OTHER REFERENCES

Skinner et al.: The Science of Dental Materials, published 1954 by Saunders Co., Philadelphia, pages 59–60.